(12) United States Patent
Krishnamoorthy

(10) Patent No.: US 10,171,340 B2
(45) Date of Patent: Jan. 1, 2019

(54) INTERWORKING NETWORK ELEMENT

(75) Inventor: Balasubramanian Krishnamoorthy, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 0 days.

(21) Appl. No.: 13/261,744

(22) PCT Filed: Aug. 11, 2011

(86) PCT No.: PCT/IN2011/000536
§ 371 (c)(1),
(2), (4) Date: Jan. 7, 2014

(87) PCT Pub. No.: WO2012/127490
PCT Pub. Date: Sep. 27, 2012

(65) Prior Publication Data
US 2014/0112341 A1    Apr. 24, 2014

(30) Foreign Application Priority Data
Mar. 24, 2011  (IN) ................ 903/CHE/2011

(51) Int. Cl.
| | |
|---|---|
| H04L 12/715 | (2013.01) |
| H04L 12/46 | (2006.01) |
| H04L 12/935 | (2013.01) |
| H04L 29/06 | (2006.01) |
| H04L 12/931 | (2013.01) |

(52) U.S. Cl.
CPC .......... H04L 45/04 (2013.01); H04L 12/4625 (2013.01); H04L 49/3009 (2013.01); H04L 69/08 (2013.01); H04L 49/351 (2013.01)

(58) Field of Classification Search
CPC ............................ H04L 12/46; H04L 12/2465
USPC .......................................................... 370/392
See application file for complete search history.

(56) References Cited

U.S. PATENT DOCUMENTS

| | | | |
|---|---|---|---|
| 2004/0066781 A1* | 4/2004 | Shankar et al. ............... 370/389 |
| 2004/0095941 A1* | 5/2004 | Natsume ............. H04L 12/4645 370/395.53 |
| 2005/0138149 A1* | 6/2005 | Bhatia ........................... 709/220 |
| 2008/0198857 A1* | 8/2008 | Kim et al. .................... 370/401 |
| 2008/0267198 A1* | 10/2008 | Sajassi ............... H04L 12/4625 370/401 |
| 2010/0142537 A1* | 6/2010 | Lee ........................ H04L 45/00 370/395.53 |

* cited by examiner

*Primary Examiner* — Anh Vu H Ly
*Assistant Examiner* — Hector Reyes
(74) *Attorney, Agent, or Firm* — Oliff PLC

(57) ABSTRACT

The invention relates to a method and device for managing the interconnection between network domains. In one embodiment this is accomplished by classifying the received frame based on service level agreement, wherein the classifying includes checking the received frame Ethertype value is same as the port on which the frame is received, recognizing an Ethertype of the egress port of the received frame, wherein the recognizing includes checking the received frame Ethertype value is same or not and translating the frame into a compatible Ethertype and forwarding the same to the next available port.

10 Claims, 3 Drawing Sheets

INTERWORKING NETWORK ELEMENT

REFERENCE TO RELATED APPLICATIONS

The present application is a national stage of International Patent Application PCT/IN2011/000536, filed 11 Aug. 2011, which claims the benefit of Indian Patent Application Serial No. 903/CHE/2011, filed 24 Mar. 2011, all of which are hereby incorporated by reference.

FIELD OF THE INVENTION

The invention generally relates to interconnections between networks and, more (particularly, to a method and device for managing the interconnection between network domains.

BACKGROUND OF THE INVENTION

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

Ethernet is a well known networking protocol that has been defined by the Institute of Electrical and Electronics Engineers (IEEE) as standard 802.1. Conventionally, Ethernet has been used to implement networks in enterprises such as businesses and campuses, and other technologies have been used to transport network traffic over longer distances. As the Ethernet standards have evolved over time, Ethernet has become more viable as a long distance transport technology as well.

Several fields that have been added to the Ethernet standards. The original Ethernet frame format specified by IEEE 802.1 includes a source address (C-SA) and a destination address (C-DA). IEEE 802.1Q added a Customer VLAN tag (C-Tag) which includes an Ethertype, TCI information, and customer VLAN ID. IEEE 802.1ad added a provider VLAN tag (S-Tag), which also includes an Ethertype, TCI information, and subscriber VLAN ID. The C-Tag allows the customer to specify a VLAN, while the S-Tag allows the service provider to specify a VLAN on the service provider's network for the frame. These tags also allow the customer and subscriber to specify other aspects which are not relevant to an understanding of the contribution disclosed herein. When a network is implemented using 802.1ad it may be referred to as Q in Q encapsulation or Provider Bridging (PB). A domain implemented using this Ethernet standard will be referred to as a Provider Bridging (PB) domain.

The Ethernet standard has evolved to also allow for a second encapsulation process to take place as specified in IEEE 802.1ah. Specifically, an ingress network element to a service provider's network may encapsulate the original Ethernet frame with an outer MAC header including a destination address on the service provider's network (B-DA), a source address on the service provider's network (B-SA), a VLAN ID (B-VID) and a service instance tag (I-SID). The combination of customer MAC addresses C-SA and C-DA with the I-SID are commonly referred to as the I-Tag. A domain implemented using this Ethernet standard will be referred to as a Provider Backbone Bridging (PBB) domain.

When a network is divided or where different networks owned by different entities, it is often desirable to connect the networks to allow data to be exchanged between the networks. However, the interconnection should occur such that control information is able to be contained within the network domain to limit visibility between domains. This allows customers to transmit data across the interconnected networks while maintaining the independence of the various network domains. However, conventional switching devices and methods do not allow for non-standard/pre-standard equipments to send frames with non-standard Ethertypes that ingress a network and still enable egress to be standard. Therefore, building networks with standard equipments in the core from other vendors has been difficult. Further, due to existing switching device and method configuration, conventional C-VLAN based networks have not been transparent across 802.1ad and 802.1ah clouds.

Due to the large number of protocols that may be used in the network domains, and the several different ways in which the network domains may be interconnected, it would be advantageous to provide a way in which the interconnection could be managed in a systemic and intelligent fashion.

SUMMARY OF THE INVENTION

An aspect of the present invention is to address at least the above-mentioned problems and/or disadvantages and to provide at least the advantages described below.

Accordingly, an aspect of the present invention is to provide a method for processing a frame at a network element, comprising classifying the received frame based on service level agreement, wherein the classifying includes checking the received frame Ethertype value is same as the port on which the frame is received, recognizing an Ethertype of the egress port of the received frame, wherein the recognizing includes checking the received frame Ethertype value is same or not and translating the frame into a compatible Ethertype and forwarding the same to the next available port.

In accordance with another aspect of the present invention provide a network element for processing a frame, where the frame travels from at least one first network to a second network, the network element comprising a processor, a plurality of ports coupled to the processor for receiving the frame, a memory coupled to the processor for storing the received frame and a network protocol module coupled to the processor, wherein the processor is configured for classifying the received frame based on service level agreement, wherein the classifying includes checking the received frame Ethertype value is same as the port on which the frame is received, recognizing an Ethertype of the egress port of the received frame, wherein the recognizing includes checking the received frame Ethertype value is same or not and translating the frame into a compatible Ethertype and forwarding the same to the next available port.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
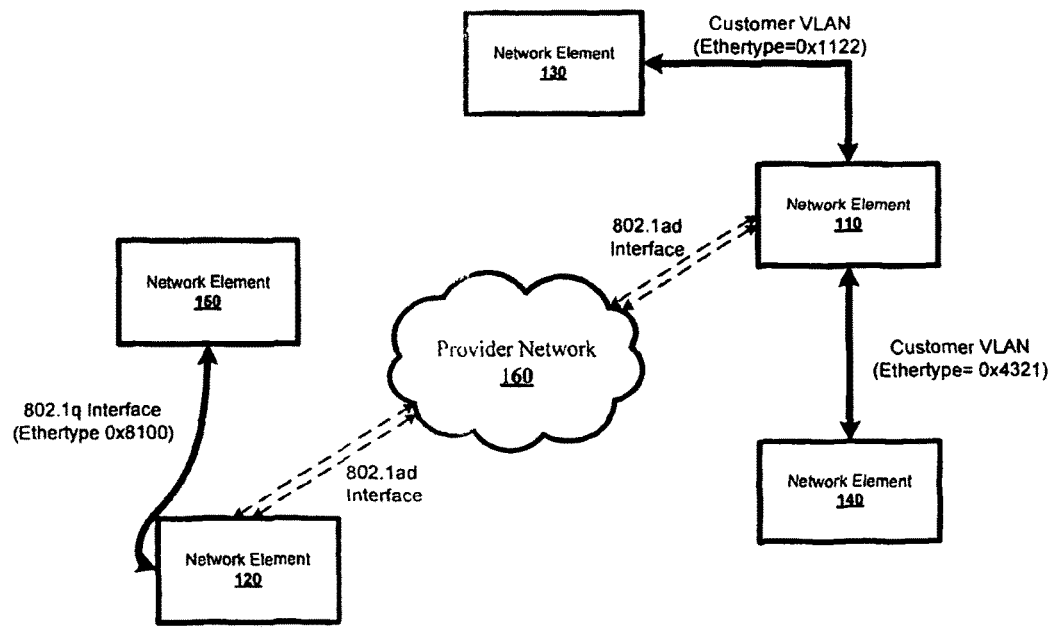
FIG. 1 depicts a block schematic diagram of network architecture for practicing the method of the present invention.
Figure 2:
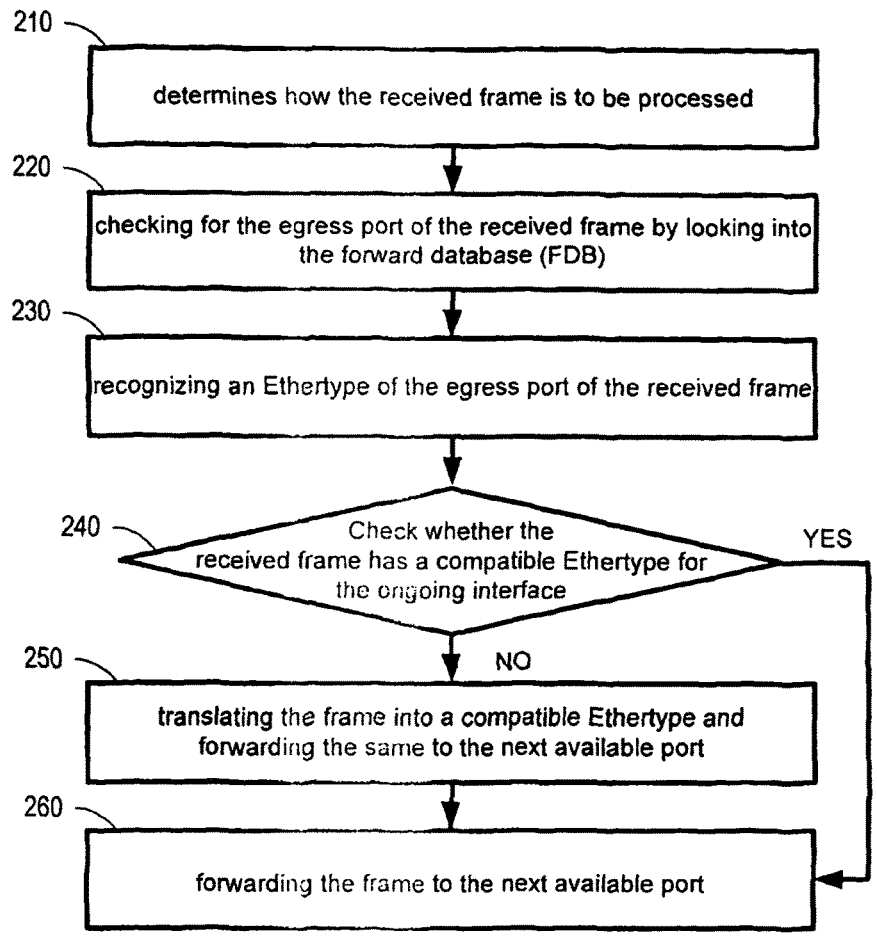
FIG. 2 shows a flow chart of a method for processing a frame at a network element according to an embodiment of the invention.
Figure 3:
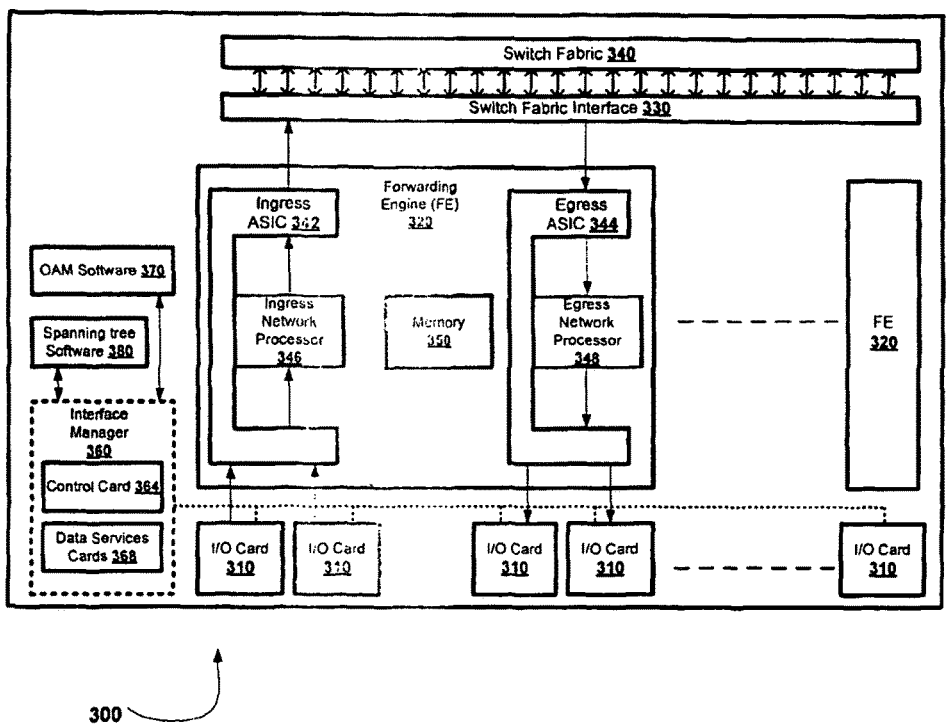
FIG. 3 is a functional block diagram of a network element according to an embodiment of the invention.

FIGS. 1 through 3, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 depicts a schematic system diagram of network architecture for practicing the method of the present invention. The system includes one or more network elements which are connected to each other. The network elements may have one or more ports (not shown in figure) which are capable of receiving and transmitting frames within the network. It is also possible that the network ports may send and received frames from more than one type of networks. In this FIG. 1, the network elements 110 and 120 are connected via provider network. The interface between the two network elements i.e. 110 and 120 may be a 802.1ad interface or/and 802.1ah interface.

The network element 110 is connected to network elements 130 and 140, where both the elements are interface with 802.1Q. Similarly, the network element 150 which is connected to network element 120 is interface with 802.1Q. In the present system all the network elements are interconnected with one or more interfaces i.e. 802.1Q, 802.1ad, 802.1ah etc. through one or more networks. The network elements may be or may include but not limited to Ethernet switches, IP routers, cross-connects etc.

In an example embodiment, there are two customers VLAN of Ethertype 0x4321 and 0x1122. The network element 140 sends a frame to network element 130 and for the same the frame has to pass through network element 110 or the frame has to go on the links connecting the network elements 130 and 140. At the network element 110, the frame is received by 110 from 140 with Ethertype (Tag Protocol Identifier) 0x4321. The Ethertype in the frame indicate which protocol is encapsulated in the Payload of an Ethernet Frame. This Ethertype on the frame is only for indicating a tagged frame on the link connecting 140 and 110. Once the frame is received at 110, the network element 110 checks for the egress port of the received frame by looking into the forward database (FDB) thereby identifying the egress link is in the same hierarchy (i.e. Two links/LANs are defined to be in the same hierarchy if the functional or processing requirements of the outer-most tags of the frames flowing over the individual link/LAN is identical), the Ethertype of the frame is rewritten with the Ethertype of the egress link (e.g. 0X1122) and sent out to the other available port.

In another aspect of the present invention, the network element sends a frame to go on the link connecting 110 to the provider network i.e. network element 120. The network element 110 receives a frame from 140 with Ethertype 0x4321, where the Ethertype on the frame is only for indicating a tagged frame on the link connecting network element 110 and 140. Once the frame is received at 110, the network element 110 checks for the egress port of the received frame by looking into the forward database (FDB) thereby identifying egress link is on a different hierarchy, the Ethertype of the frame is rewritten with the standard Ethertype of the ingress hierarchy 0x8100 before encapsulated in the next hierarchy. The encapsulation of the information of the received frame of a first network into a superior frame or next hierarchy of a second network, where the information may be or may include a generic header of a first format of the received frame which identifies the category of first network.

At the output port of the network element which is connected to provider network, the modified frame is sent out on the egress link i.e. link connecting 110 to provider network.

The frame on arrival at network element 120 has a transport encapsulation and a standard Ethertype indicating the VLAN (Virtual Local Area Network) belonging to the original hierarchy. The interworking facility, the network element 120 of the second network is configured for separating the information associated with the received frame and made available in a compatible form to the first network.

FIG. 2 shows a flow chart of a method for processing a frame at a network element according to an embodiment of the invention. The method begins at step 210, where the method determines whether the received frame is to be processed on the port of the network element on which the frame is received. The determination is based on the classification of the frame for treatment based Service Level Agreement.

At step 220, the method checks for the egress port of the received frame by looking into the forward database.

At step 230, the method recognizes an Ethertype of the egress port of the received frame. The method recognizing which includes checking the received frame Ethertype value is same or not.

At step 240, the method further checks whether the received fame is a compatible Ethertype for the ongoing interface. If the frame is compatible with the ongoing interface, the method then allows the frame to pass through the network.

If the Ethertype of the received frame is same then method allows forwarding the frame to the next available port at step 260. Here the frame is forwarded to the next available port without any modification.

Else, the method translates the frame into a compatible Ethertype and forwards the same to the next available port at step 250. The translation includes converting the non-standard Ethertype of the frame to a standard Ethertype based on the incoming port of the network element.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

FIG. 3 shows one embodiment of a network element 300 that may be configured to implement an embodiment of the invention. The network element may be used to implement one of the S-PEs 26, one of the MSEs 28, or another network element on the network. The invention is not limited to a network element configured as illustrated, however, as the invention may be implemented on a network element configured in many different ways. The discussion of the specific structure and methods of operation of the embodiment illustrated in FIG. 3 is intended only to provide one example of how the invention may be used and implemented in a particular instance. The invention more broadly may be used in connection with any network element configured to handle Ethernet frames (i.e. carrying any protocol like 802.1Q or 802.1ad or 802.1 ah etc) in a communications network.

As shown in FIG. 3, the network element 300 generally includes Input/output (I/O) cards 310 configured to connect to links in the communications network. The I/O cards 310 may include physical interfaces, such as optical ports, electrical ports, wireless ports, infrared ports, or ports configured to communicate with other conventional physical media, as well as configurable logical elements capable of operating as MAC (layer 2) ports under the direction of an interface manager, described in greater detail below.

One or more forwarding engines 320 are provided in the network element to process frames received over the I/O cards 310. The forwarding engines 320 forward frames to a switch fabric interface 330, which passes the packets to a switch fabric 340. The switch fabric 48 enables a frame entering on a port on one or more I/O cards 310 to be output at one or more different ports in a conventional manner. A frame returning from the switch fabric 340 is received by one of the forwarding engines 320 and passed to one or more I/O cards 310. The frame may be handled by the same forwarding engine 320 on both the ingress and egress paths. Optionally, where more than one forwarding engine 320 is included in the network element, a given frame may be handled by different forwarding engines on the ingress and egress paths. The invention is not limited to any particular forwarding engine 320, switch fabric interface 330, or switch fabric 340, but rather may be implemented in any suitable network element configured to handle Ethernet frames on a network. One or more Application Specific Integrated Circuits (ASICs) 342, 344 and processors 346, 348 may be provided to implement instructions and processes on the forwarding engines 320. Optionally, a memory 350 may be included to store data and instructions for use by the forwarding engines.

An interface management system 360, optionally containing one or more control cards 364 and one or more data service cards 368, may be provided to create and manage interfaces on the network element. The interface management system may interact with an OAM module 370 locally instantiated on the network element or interfaced to the network element over a management interface port. The OAM module 370 may be implemented in software, firmware, hardware, or in any other manner as discussed in greater detail here. The OAM module 370 is responsible for sending and receiving OAM frames to allow the interface management system 360 to administratively disable one or more of the ports implemented on the I/O cards 310 upon detection of a link failure on the network. Spanning tree software 380 may also be provided to enable the network element to participate in calculating one or more spanning trees to be implemented in the interface region.

When the functions described herein are implemented in software, the software may be implemented as a set of program instructions configured to operate in control logic on a network element that are stored in a computer readable memory within the network element and executed on a microprocessor. For example, in the network element of FIG. 3, the OAM functions may be performed by OAM module 370 implemented as software and executed on a processor associated with the interface manager 360. Likewise, the spanning tree functions described herein may be performed by Spanning Tree module 380 and executed on a processor associated with the interface manager 60. However, in this embodiment as with the previous embodiments, it will be apparent to a skilled artisan that all or some of the logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof.

Programmable logic can be fixed temporarily or permanently in a tangible medium such as a read-only memory chip, a computer memory, a computer disk, or other storage medium. All such embodiments are intended to fall within the scope of the present invention.

FIGS. 1-3 are merely representational and are not drawn to scale. Certain portions thereof may be exaggerated, while others may be minimized. FIGS. 1-3 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

I claim:

1. A method, comprising:
    comparing Ethertype of a received frame at a network element based on a service level agreement, with an Ethertype associated with a source domain;
    recognizing a destination Ethertype associated with a destination domain determined via lookup of a forward database stored in the network element, wherein the recognizing includes determining if the received frame Ethertype is same as the destination Ethertype or not;
    determining if the destination domain is of type 802.1Q, 802.1ad, or 802.1ah, wherein the determining includes recognizing domain types of 802.1Q, 802.1ad, and 802.1ah; and
    translating the Ethertype of the received frame to include the Ethertype of the destination domain, wherein the translation includes overwriting or appending the Ethertype of the received frame with an Ethertype associated with the destination domain and/or encapsulating the received frame with an Ethertype associated with the destination domain.

2. The method of claim 1, wherein if the received Ethertype value of the frame matches the destination Ethertype, then forwarding the frame to the destination domain.

3. The method of claim 1, wherein if the received Ethertype is not matching with the destination Ethertype, then dropping the frame without forwarding to the destination domain.

4. The method of claim 1, further comprising:
    converting the information of the received frame of the first domain into a compatible frame of the destination domain, wherein the information includes part of the generic header of a first format of the received frame which identifies the category of first network.

5. The method of claim 4, further including:
    receiving said translated frame at a network element of the destination domain configured for separating the information in the payload of the translated frame and making said information available in a compatible form to the first domain.

6. The method of claim 1, wherein the Ethertype indicates which protocol is encapsulated in the Payload of an Ethernet Frame.

7. A network element for processing a frame, where the frame travels from at least one first network to a second network, the network element comprising:
    a processor;
    a memory coupled to the processor for storing a received frame; and
    a network protocol module coupled to the processor, wherein the processor is configured to:
        compare Ethertype of a received frame at a network element based on a service level agreement, with an Ethertype associated with a source domain;
        recognize a destination Ethertype associated with a destination domain determined via lookup of a forward database stored in the network element, wherein the recognizing includes determining if the received frame Ethertype is same as the destination Ethertype or not;
        determine if the destination domain is of type 802.1Q, 802.1ad, or 802.1ah, wherein the determining includes recognizing domain types of 802.1Q, 802.1ad, and 802.1ah; and
        translate the Ethertype of the received frame to include the Ethertype of the destination domain, wherein the translation includes overwriting or appending the Ethertype of the received frame with an Ethertype associated with the destination domain and/or encapsulating the received frame with an Ethertype associated with the destination domain.

8. The network element of claim 7, wherein the processor is configured to determine whether the Ethertype of the received frame matches the first domain, then forwarding the frame to the destination domain, else dropping the frame.

9. The network element of claim 7, wherein the processor is configured for converting the information of the received frame of the first domain into a compatible frame of the destination domain, wherein the information includes a generic header of a first format of the received frame which identifies the type of first network.

10. The network element of claim 7, wherein the first network and the second network include networks of type 802.1Q, 802.1ad or 802.1ah.

* * * * *